(12) United States Patent
Boffa et al.

(10) Patent No.: US 10,473,457 B2
(45) Date of Patent: *Nov. 12, 2019

(54) APPARATUS FOR CONTROLLING TYRES IN A PRODUCTION LINE

(71) Applicant: PIRELLI TYRE S.P.A., Milan (IT)

(72) Inventors: Vincenzo Boffa, Milan (IT);
Alessandro Held, Milan (IT);
Valeriano Ballardini, Imola (IT);
Giuseppe Casadio Tozzi, Imola (IT)

(73) Assignee: PIRELLI TYRE S.P.A., Milan (IT)

( * ) Notice: Subject to any disclaimer, the term of this patent is extended or adjusted under 35 U.S.C. 154(b) by 75 days.

This patent is subject to a terminal disclaimer.

(21) Appl. No.: 15/535,303

(22) PCT Filed: Dec. 15, 2015

(86) PCT No.: PCT/IB2015/059612
§ 371 (c)(1),
(2) Date: Jun. 12, 2017

(87) PCT Pub. No.: WO2016/103110
PCT Pub. Date: Jun. 30, 2016

(65) Prior Publication Data
US 2018/0266810 A1    Sep. 20, 2018

(30) Foreign Application Priority Data

Dec. 22, 2014  (IT) .......................... MI2014A002210

(51) Int. Cl.
*G01M 17/02* (2006.01)
*G01B 11/24* (2006.01)
(Continued)

(52) U.S. Cl.
CPC .............. *G01B 11/24* (2013.01); *G01B 11/30* (2013.01); *G01M 17/027* (2013.01);
(Continued)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS

| | | |
|---|---|---|
| 4,606,634 A | 8/1986 | Bieringer |
| 4,634,879 A | 1/1987 | Penney |

(Continued)

FOREIGN PATENT DOCUMENTS

| | | |
|---|---|---|
| DE | 19534716 A1 | 3/1997 |
| DE | 102007009040 B3 | 5/2008 |

(Continued)

OTHER PUBLICATIONS

International Search Report for International Application No. PCT/IB2015/059575 filed on Dec. 15, 2015 in the name of Pirelli Tyre S.P.A. dated Mar. 29, 2016. 4 pages.

(Continued)

*Primary Examiner* — Andre J Allen
(74) *Attorney, Agent, or Firm* — Steinfl + Bruno LLP (57) ABSTRACT

An apparatus for checking tires described as a linear camera having an objective line lying on an optical plane; a first, a second and a third light source for emitting respectively a first, a second and a third light radiation; a command and control unit for selectively activating at least one from among the first, second and third light source and activating the linear camera in order to acquire a two-dimensional image of a linear surface portion of the tire synchronously with the activation of the first, second and third source. The first and second light source lie on opposite sides of the optical plane. Furthermore, the first, second and third light source include each one or more sub-sources each having a respective main extension direction parallel to the optical plane and the distance of the sub-sources of the third light (Continued)

source from the optical plane is less than the distance of the first and second light source from the optical plane.

30 Claims, 5 Drawing Sheets (51) Int. Cl.
    *G01B 11/30*     (2006.01)
    *G01N 21/88*     (2006.01)
    *G01N 21/954*     (2006.01)
    *G01N 21/892*     (2006.01)

(52) U.S. Cl.
    CPC ..... *G01N 21/8806* (2013.01); *G01N 21/8851* (2013.01); *G01N 21/954* (2013.01); *G01N 2021/8838* (2013.01); *G01N 2021/8924* (2013.01)

(58) Field of Classification Search
    CPC ...... G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/04; G01M 3/40; G01M 5/0091; G01M 7/02; G01M 99/00; G01M 99/002
    USPC .................................................. 73/146–146.8
    See application file for complete search history.

(56) References Cited

U.S. PATENT DOCUMENTS

| | | | |
|---|---|---|---|
| 4,697,082 | A | 9/1987 | Bartelsen |
| 5,059,031 | A | 10/1991 | Hamel et al. |
| 5,802,201 | A | 9/1998 | Nayar et al. |
| 5,987,978 | A | 11/1999 | Whitehead |
| 6,327,374 | B1 | 12/2001 | Piironen et al. |
| 6,603,874 | B1 | 8/2003 | Stern et al. |
| 6,680,471 | B2 | 1/2004 | Kokubu et al. |
| 7,421,108 | B2 | 9/2008 | Kaneko et al. |
| 7,495,231 | B2 | 2/2009 | Truche et al. |
| 7,568,385 | B2 | 8/2009 | Maehner et al. |
| 7,603,894 | B2 | 10/2009 | Breed |
| 7,843,574 | B2 | 11/2010 | Schmitt et al. |
| 8,059,279 | B2 | 11/2011 | Iino et al. |
| 8,086,019 | B2 | 12/2011 | Honda et al. |
| 8,752,423 | B2 | 6/2014 | Olivares et al. |
| 8,948,491 | B2 | 2/2015 | Sekiguchi |
| 9,091,596 | B2 | 7/2015 | Anderson et al. |
| 9,239,274 | B2 | 1/2016 | Joly |
| 9,310,278 | B2 | 4/2016 | Sukegawa |
| 9,704,237 | B2 | 7/2017 | Araki et al. |
| 10,118,448 | B2 | 11/2018 | Mizutani |
| 10,313,574 | B2 | 6/2019 | Hanel et al. |
| 2002/0009218 | A1 | 1/2002 | Chapman et al. |
| 2003/0048352 | A1 | 3/2003 | Kato et al. |
| 2004/0212795 | A1 | 10/2004 | Steinbichler et al. |
| 2005/0264796 | A1* | 12/2005 | Shaw ................... G01B 11/162 356/237.2 |
| 2006/0083347 | A1* | 4/2006 | Nosekabel ............. G01B 11/25 378/61 |
| 2007/0279931 | A1 | 12/2007 | Bryan et al. |
| 2008/0202229 | A1* | 8/2008 | Maehner .............. G01B 11/161 73/146 |
| 2008/0214391 | A1 | 9/2008 | Kawahara et al. |
| 2010/0002244 | A1* | 1/2010 | Iino ..................... G01M 17/027 356/601 |
| 2010/0180676 | A1* | 7/2010 | Braghiroli .......... G01M 17/027 73/146 |
| 2011/0018999 | A1 | 1/2011 | Joly et al. |
| 2011/0188731 | A1 | 8/2011 | Sekiguchi et al. |
| 2011/0228414 | A1 | 9/2011 | Locatelli et al. |
| 2011/0288814 | A1* | 11/2011 | Mizutani ............ G01B 11/2522 702/150 |
| 2012/0008148 | A1 | 1/2012 | Pryce et al. |
| 2012/0020526 | A1* | 1/2012 | Teti ....................... G06T 7/0004 382/104 |
| 2012/0134656 | A1 | 5/2012 | Mizukusa et al. |
| 2013/0104984 | A1 | 5/2013 | Myrskog |
| 2014/0341460 | A1 | 11/2014 | Ballabio et al. |
| 2015/0338066 | A1 | 11/2015 | Al-Saud et al. |
| 2016/0258842 | A1 | 9/2016 | Taylor et al. |
| 2016/0377556 | A1 | 12/2016 | Boffa et al. |
| 2017/0350793 | A1 | 12/2017 | Boffa et al. |
| 2017/0370807 | A1 | 12/2017 | Boffa et al. |
| 2018/0172557 | A1* | 6/2018 | Ghidotti Piovan . G01M 17/027 |
| 2018/0189939 | A1* | 7/2018 | Ghidotti Piovan . G01M 17/027 |
| 2018/0299352 | A1* | 10/2018 | Rose ..................... B60C 11/246 |
| 2018/0299353 | A1* | 10/2018 | Held .................... G01M 17/027 |
| 2018/0328819 | A1 | 11/2018 | Boffa et al. |
| 2018/0364134 | A1* | 12/2018 | Held .................... G01M 17/027 |
| 2018/0372590 | A1* | 12/2018 | Held .................... G01M 17/027 |
| 2018/0372592 | A1* | 12/2018 | Held ...................... G01M 17/02 |
| 2019/0017902 | A1* | 1/2019 | Held .................... G01M 17/027 |
| 2019/0086293 | A1 | 3/2019 | Held et al. |
| 2019/0145862 | A1 | 5/2019 | Boffa et al. |

FOREIGN PATENT DOCUMENTS

| | | | |
|---|---|---|---|
| EP | 1120640 | A1 | 8/2001 |
| EP | 1742041 | A1 | 1/2007 |
| EP | 2078955 | A1 | 7/2009 |
| EP | 2322899 | A1 | 5/2011 |
| EP | 2172737 | B1 | 4/2013 |
| JP | 2012112838 | A | 6/2012 |
| WO | 2014097133 | A1 | 6/2014 |
| WO | 2015/004587 | A1 | 1/2015 |

OTHER PUBLICATIONS

International Written Opinion for International Application No. PCT/IB2015/059575 filed on Dec. 15, 2015 in the name of Pirelli Tyre S.P.A. dated Mar. 29, 2016. 8 pages.
International Search Report for International Application No. PCT/IB2015/059612 filed on Dec. 15, 2015 in the name of Pirelli Tyre S.P.A.. dated Mar. 29, 2016. 4 pages.
International Written Opinion for International Application No. PCT/IB2015/059612 filed on Dec. 15, 2015 in the name of Pirelli Tyre S.P.A.. dated Mar. 29, 2016. 8 pages.
International Preliminary Report on Patentability for International Application No. PCT/IB2015/059575 filed on Dec. 14, 2015 on behalf of Pirelli Tyre S.P.A. dated Jun. 27, 2017 9 pages.
International Preliminary Report on Patentability for International Application No. PCT/IB2016/057711 filed on Dec. 16, 2016 on behalf of Pirelli Tyre S.P.A. dated Jun. 19, 2018 8 pages.
International Search Report for International Application No. PCT/IB2016/057711 filed on Dec. 16, 2016 on behalf of Pirelli Tyre S.P.A. dated Mar. 20, 2017. 4 pages.
Written Opinion for International Application No. PCT/IB2016/057711 filed on Dec. 16, 2016 on behalf of Pirelli Tyre S.P.A. dated Mar. 20, 2017. 7 pages.
Non-Final Office Action for U.S. Appl. No. 15/536,095 filed Jun. 14, 2017 on behalf of Pirelli Tyre S.P.A dated Jun. 21, 2019 15 pages.
Non-Final Office Action for U.S. Appl. No. 16/060,707 filed Jun. 8, 2018 on behalf of Pirelli Tyre S.P.A dated May 24, 2019 17 pages.

* cited by examiner

APPARATUS FOR CONTROLLING TYRES IN A PRODUCTION LINE

CROSS REFERENCE TO RELATED APPLICATIONS

The present application is the U.S. national stage of International Patent Application PCT/IB2015/059612 filed internationally on Dec. 15, 2015, which, in turn, claims priority to Italian Patent Application No. MI2014A002210 filed on Dec. 22, 2014.

FIELD OF THE INVENTION

The present invention relates to an apparatus for checking tyres in a tyre production line, in particular by means of acquisition of images of the surface of a tyre and their subsequent processing, e.g. for checking the possible presence of defects visible on the surface of a tyre.

Definitions

By "tyre", it is typically intended the finished tyre, i.e. after the steps of moulding and vulcanisation following the building step, but also possibly the green tyre after the step of building and before the moulding and/or vulcanisation.

Typically a tyre has substantially toroidal structure around a rotation axis thereof during operation, and has an axial centreline plane orthogonal to the rotation axis, said plane being typically a plane of (substantial) geometric symmetry (e.g. ignoring possible minor asymmetries, such as the design of the tread and/or the internal structure).

For external or internal surface of the tyre, it is respectively intended the surface that remains visible after the coupling of the tyre with its mounting rim and the surface which is no longer visible after said coupling.

The terms 'optical', 'light' and the like refer to an electromagnetic radiation which has at least one portion of the spectrum falling within an enlarged range of the optical band, not necessarily falling strictly within the optical band (i.e. 400-700 nm); for example, such enlarged range of the optical band can extend from the ultraviolet to the infrared (e.g. wavelength comprised between about 100 nm and about 1 μm).

In the present application, a ray model of the light radiation is employed, i.e. it is assumed that a light radiation incident on a point of a surface and generated by a non-point source (in such case there would be only one ray) corresponds with a set of light rays incident on the point and having rectilinear propagation direction that connects each point of the source with said point of the surface, wherein each of such rays has, associated therewith, a fraction of the overall light power incident on the point.

By "directional light radiation" incident at a point of a surface, it is intended a light radiation for which there is a solid angle having the point as vertex and amplitude smaller than or equal to π/8 steradians within which at least 75% of the overall light power, preferably at least 90%, more preferably all the light power lies.

By "diffuse light radiation" it is intended a non-directional light radiation.

By "grazing light radiation" incident at a point of a surface, it is intended a light radiation in which at least 75% of the overall light power of the same incident on the point of the surface forms, with a plane tangent to the surface at said each point, an incidence angle smaller than or equal to 60°.

By "image" or synonymically "digital image", it is generally intended a set of data, typically contained in a computer file, wherein each coordinate (typically two-dimensional) of a finished set (typically two-dimensional and matrix, i.e. N lines×M columns) of spatial coordinates (each typically corresponding to one pixel) is associated with a corresponding set of number values (which can be representative of sizes of different type). For example, in the monochromatic images (such as 'greyscale' images), such set of values coincides with a single value in a finished scale (typically with 256 levels or tones), such value being for example representative of the brightness (or intensity) level of the respective spatial coordinate when displayed, while in the colour images the set of values represents the brightness level of a multiplicity of colours or channels, typically the primary colours (e.g. in the code RGB, red, green and blue, while in the code CMYK cyan, magenta, yellow and black). The term 'image' does not necessarily imply the actual display of the same.

In the present description and claims, each reference to a specific "digital image" (e.g. a two-dimensional digital image initially acquired on the tyre) more generally comprises any one digital image obtainable through one or more digital processing of said specific digital image (such as filtering, equalisations, thresholding, morphological transformations—openings, etc.,—gradient calculations, smoothing, etc.).

By "linear surface portion" it is intended a surface portion having a size much greater than the other size orthogonal thereto, typically greater than at least two orders of magnitude. The smaller size of the linear surface portion is typically smaller than or equal to 0.1 mm.

By "linear image" it is intended a digital image having a number of columns of pixels much greater than the number of lines, typically greater than at least two orders of magnitude. Typically the number of lines is between 1 and 4 and the number of columns is greater than 1000. The terms 'lines' and 'columns' are used conventionally and are interchangeable.

Hereinbelow, the reference to the light sources and/or to the respective sub-sources is intended as a reference to the respective emitting surface as visible from the objective line.

BACKGROUND

In the field of the processes of production and building of tyres for vehicles wheels, there is the need to execute quality checks on the manufactured products, with the purpose of preventing defective tyres or in any case those outside design specifications from being placed on the market, and/or progressively adjusting the employed apparatuses and the machines, so as to improve and optimize the execution of the operations carried out in the production process.

Such quality checks for example include those executed by human operators, who dedicate a pre-established time on a visual and tactile examination of the tyre; if, in light of the operators own experience and sensitivity, he/she should suspect that the tyre does not comply with certain quality standards, the tyre itself is subjected to further checks, by means of a more detailed human check and/or suitable equipment, for the purpose of providing an in-depth evaluation of possible structural and/or qualitative deficiencies.

US 2010/0002244 A1 describes a technique for inspecting the surface of a tyre that is capable of discriminating, with certainty, small pieces of rubber of different quality incorporated in the surface of the tyre. A first illumination unit includes a pair of first light projectors which project the light towards an objective line, respectively from opposite sides. A second illumination unit includes a pair of second light projectors which project the light towards the objective line in a direction different from that of the first illumination unit and respectively from opposite sides. The first and second illumination unit alternately illuminate. A linear camera forms an image of a surface portion of the tyre corresponding with the objective line synchronously with the respective illumination operations of the first and second illumination unit.

US 2004/0212795 A1 describes a method for measuring a border and/or a deformation of an object. In order to improve the quality of the image, a first image is created with a first configuration of the camera and/or of the radiation source which is adapted for a first region of the image. In addition, a second image is created with a second configuration of the camera and/or of the radiation source which is adapted for a second region of the image. The two images are combined. U.S. Pat. No. 6,680,471 B2 describes an apparatus capable of uniformly illuminating the curved internal surface of a tyre by means of LED and CCD.

US 2012/0134656 A1 describes an illumination device and an inspection device for a tyre which can easily detect shape abnormalities in a produced tyre.

SUMMARY

In the field of tyre checks, the Applicant has set the problem of analysing the internal and/or external surface of the tyre, by means of optical acquisition of digital images of the same and their subsequent processing, for example in order to detect the possible presence of defects visible on the surface. The sought-after defects can for example be irregularities on the surface of a tyre (non-vulcanised compound, shape alterations, etc.), structural non-uniformities, cuts, presence of foreign bodies on the surface, etc.

The Applicant has observed that for the check to be employed "in line" within a plant for producing tyres, it is necessary that the check itself is executed in limited times and with reduced costs.

The Applicant has also observed that in the "three-dimensional" images (i.e. each pixel thereof is associated with surface altitude information, e.g. the images obtained with laser triangulation), some two-dimensional defects (i.e. which do not involve an alteration of the altitude of the surface, such as the cuts with mating edges) are difficult to detect, or are not at all detectable, by means of image processing.

In addition, the size resolution of the three-dimensional images, in particular in the direction of the altitude, at times does not result sufficiently high for detecting defects that are not very marked.

The Applicant has therefore perceived that it is advantageous to detect and analyse "two-dimensional" images (in addition to or in alternative to the 3D images).

For the purpose of the present description and claims, the term 'two-dimensional image' signifies a digital image, each pixel thereof associated with information representative of the reflectivity/diffusivity and/or of the colour of the surface, such as the images detected by common digital cameras.

The Applicant has realised that in the apparatuses of check of the tyres with optical acquisition of two-dimensional images of the type described in US 2010/0002244 A1, the arrangement of the light sources 11a,b and 12a,b orthogonal to each other translates into a high overall bulk of the light source group. In addition, the objective line is always illuminated simultaneously from opposite sides, hence only producing a two-dimensional image acquired with diffuse light.

The Applicant has also realised that the check apparatuses with optical acquisition of two-dimensional images of the type described in US 2004/0212795 A1, in which the image is acquired with a matrix camera, is not adapted for the efficient acquisition of an image over the entire circular extension of a tyre. In addition, the relative arrangement and structure of the light sources, with respect to each other and with respect to the camera, makes the overall bulk of the source group and/or of the camera-source group assembly very high.

The Applicant has also realised that the illumination apparatuses of the type described in U.S. Pat. No. 6,680,471 B2, in which the cameras are side-by-side the light sources on one side of the latter, does not allow a versatility of illumination of the surface of a tyre. For example, this does not allow obtaining both images with grazing light and images with diffuse light. In addition, the structure and arrangement of the cameras and of the sources makes the overall structure complex and not very versatile.

The Applicant has also realised that the illumination apparatuses of the type described in US 2012/0134656 A1, comprising among other things two cameras, have a complex structure that is bulky and not very versatile in acquiring images in diffuse and/or grazing light.

The Applicant has therefore set the problem of implementing an apparatus for checking tyres that is capable of acquiring two-dimensional images (in particular for detecting defects on the tyre surface) of the surface of a tyre, which is adapted for insertion in a line within a tyre production line of a production plant, i.e. adapted to be employed with reduced operating times and costs, and capable of providing reliable results.

The Applicant has perceived that by arranging a linear camera and at least three light sources with a respective main extension direction substantially parallel to the optical plane where the objective line of the camera lies, where two light sources are arranged on opposite sides of the optical plane and the third is interposed between these, allows the acquisition of images both in diffuse light and in grazing light, particularly useful for the purpose of the aforesaid tyre check.

More precisely the Applicant has finally found that an apparatus comprising a linear camera having an objective line and at least three light sources which are substantially extended parallel to the objective line and on opposite sides of the latter, the third light source being interposed between the first two, is particularly compact and easy to handle; it can be brought suitably close to the surface of the tyre and/or it can be inserted within of the tyre itself. In addition, it has proven to be particularly versatile in acquiring diffuse light images with high power and/or with wide solid incidence angle and/or in acquiring images with grazing light from at least one or from both sides of the objective line, also allowing the detection of three-dimensional defects starting from two-dimensional images.

In accordance with a first aspect, the invention relates to an apparatus for checking tyres in a tyre production line.

Preferably a support for a tyre is comprised.

Preferably a detection system is comprised, comprising a linear camera having an objective line lying on an optical plane passing through the linear camera.

Preferably a first light source, a second light source and a third light source are comprised, adapted to respectively emit a first, a second and a third light radiation in order to illuminate a linear surface portion of said tyre coinciding with or in proximity to said objective line.

Preferably said first light source and second light source respectively lie on opposite sides with respect to said optical plane.

Preferably a command and control unit is comprised, configured for:
- selectively activating one or more of said first light source, second light source and third light source and
- activating said linear camera in order to acquire a respective two-dimensional image of said linear surface portion synchronously with the activation of said at least one from among said first light source, second light source and third light source.

Preferably each of said first light source, second light source and third light source comprises one or more respective sub-sources, each having a respective main extension direction which forms, with said optical plane, an angle smaller than or equal to 45°.

Preferably the distance of said sub-sources of the third light source from said optical plane is less than the distance between each of said first light source and second light source and said optical plane.

The Applicant deems that for the purpose of checking the surface of tyres in a production line, in particular in order to detect possible defects on said surface, by means of acquisition and processing of two-dimensional digital optical images, the arrangement of at least three light sources with a respective main extension direction substantially parallel (i.e. less than 45°) with respect to the optical plane in which the objective line of the camera lies, where the first light source and the second light source respectively lie on opposite sides of the optical plane and the third light source is interposed between the first and the second, it confers particular compactness and manageability to the apparatus, and/or allows a diffuse illumination of the objective line with wide solid angle and/or allows acquiring images both in diffuse light and with grazing light from one or both sides of the objective line.

The present invention can also have one or more of the preferred characteristics described hereinbelow.

Preferably, with a focal plane orthogonal to said optical plane and passing through the objective line, a respective angle formed between said focal plane and any one plane passing through said objective line and any one point respectively of said first light source and second light source is smaller than or equal to 60°, more preferably smaller than or equal to 55°. In such a manner, a first and a second grazing light radiation is obtained at the surface portion.

Preferably, a respective angle formed between said focal plane and any one plane passing through said objective line and any one point respectively of said first light source and second light source is greater than or equal to 10°, more preferably greater than or equal to 20°, still more preferably greater than or equal to 30°. In such a manner, the positioning of the source group is allowed in proximity to the objective line.

Preferably said third light source is adapted to illuminate said objective line with diffuse light.

Preferably, for each point of the objective line, a respective angle having vertex at the point and lying in a reference plane orthogonal to the objective line, and subtended by said third light source, is greater than or equal to 60°, more preferably greater than or equal to 70°. In such a manner, a wide solid angle of the diffuse light is obtained.

Preferably, a respective angle in a reference plane orthogonal to said objective line, having vertex in each point of the objective line and subtended by the set of said first light source, second light source and third light source, is greater than or equal to 70°, more preferably greater than or equal to 80°. In such a manner, a still wider solid angle of the diffuse light is obtained, also using the first light source and the second light source simultaneously with the third light source in order to acquire an image in diffuse light.

Preferably said third light source comprises a plurality, more preferably at least four, of respective sub-sources distributed on both sides of said optical plane, more preferably symmetrically distributed with respect to said optical plane. In such a manner, one obtains a uniform illumination of the objective line with diffuse light and additionally the source group is made particularly compact.

Preferably each of said first light source, second light source and third light source comprises said one or more respective sub-sources.

Preferably the first light source and the second light source comprise each only one sub-source. In such a manner, these produce a respective directional and preferably grazing radiation.

Preferably said respective main extension direction of each of said one or more respective sub-sources forms, with said optical plane, an angle smaller than or equal to 30°.

Preferably said respective main extension direction of each of said one or more respective sub-sources forms, with said optical plane, an angle smaller than or equal to 15°.

Still more preferably, said respective main extension direction of each of said one or more respective sub-sources is parallel to said optical plane.

In such a manner, the illumination of the objective line and the overall bulk of the source group is optimised.

Preferably said first light source and second light source lie equidistant from said optical plane.

Preferably said respective sub-sources have one dimension along the main extension direction at least double, more preferably at least one order of magnitude greater than the dimension orthogonal to said main extension direction. Preferably each of said sub-sources has the dimension along said main extension direction smaller than or equal to 20 cm, more preferably smaller than or equal to 15 cm.

Preferably each of said sub-sources has the dimension along said main extension direction greater than or equal to 5 cm.

Preferably each of said sub-sources has the dimension orthogonal to said main extension direction smaller than or equal to 3 cm, more preferably smaller than or equal to 2 cm. The aforesaid dimensions allow the sub-sources to be effectively shaped to the objective line and to reduce the bulk.

Preferably said respective sub-sources are structurally and/or dimensionally equal to each other. In such a manner, the source group is simplified in structure, operation and maintenance.

Preferably said respective sub-sources have rectilinear extension along the main extension direction. In such a manner, the bulk is reduced, while maintaining a high illumination effectiveness.

Preferably the sub-sources of the first light source, second light source and third light source are arranged in a manner such that for at least half of their extension, they are superimposed in a view orthogonal to the objective line.

Preferably the sub-sources of the first light source, second light source and third light source are arranged in a manner such that for their entire extension, they are superimposed in a view orthogonal to the objective line. In such a manner the bulk of the source group is reduced.

Preferably the sub-sources of the first light source, second light source and third light source are arranged along a line on a reference plane orthogonal to the objective line, having concavity directed towards the objective line. In one embodiment, said sub-sources are equidistant from said objective line (i.e. they are distributed on an arch of a circle). In an alternative embodiment, said sub-sources are arranged as a triangle, more preferably with vertex on the optical plane.

Preferably all the sub-sources lying on one side of said optical plane are distributed equidistant from each other. In such a manner, it is simpler to adjust the light intensity incident on the objective line.

Preferably, for each point of the objective line, a respective angle having vertex in said each point and lying in a reference plane orthogonal to the objective line, and subtended by each of said sub-sources, is smaller than or equal to 10°. In this manner, advantageously, each sub-source produces a directional light on the objective line and it is possible to activate the source group so as to generate a light radiation in a versatile manner, with desired directionality (e.g. the first and second light radiation) or with suitable diffuse light characteristics (e.g. the third light radiation).

In one embodiment, the detection system comprises a mirror having reflective surface arranged at the third light source perpendicular to the optical plane and intersecting the latter (typically on the median line of the mirror) in a manner so as to reflect said objective line in the optical plane by an angle greater than or equal to 30°, preferably greater than or equal to 45°, and/or smaller than or equal to 135°, preferably smaller than or equal to 120°. In such a manner, advantageously during the inspection of the internal surface of the tyre, the linear camera remains positioned in the central zone of the tyre, while the source group operates in proximity to the internal surface of the tyre.

Preferably the command and control unit is configured for:
activating in alternated sequence said first light source, second light source and third light source;
driving said linear camera in order to acquire respectively a first, second and third image synchronously with the activation of said first light source, second light source and third light source, respectively. In such a manner, it is possible to acquire both an image in diffuse light and two images in grazing light.

Preferably a processing unit is comprised, configured for the following functions:
receiving, from the linear camera, said respective image or said first, second and third image;
processing said respective image or said first, second and third image in order to check said surface portion.

Preferably the processing unit is configured for calculating the difference between said first and second image in order to obtain information on an altimetric profile (e.g. possible presence of absence of reliefs and/or depressions) of said linear surface portion.

Preferably, calculating the difference between said first and second image comprises calculating a difference image in which each pixel is associated with a value representative of the difference between the values associated with the corresponding pixels in said first and second image. In such a manner, it is possible to use the image obtained from the difference between the first and second image in order to indicate the three-dimensional elements (such as the pitting in relief on the internal surface of the tyre or the writing in relief) and keep such information under consideration in processing the image in diffuse light in order to search for defects.

Preferably the apparatus comprises a robotic arm, on which said first light source, second light source and third light source and/or said detection system are mounted.

Preferably the apparatus comprises a movement member adapted to rotate said support, and hence the tyre, around a rotation axis thereof, the command and control unit being configured for driving said movement member.

Preferably the apparatus comprises a system for detecting the angular position of said support (e.g. an encoder), the command and control unit being configured for activating said first light source, second light source and third light source and driving said detection system as a function of a signal of angular position of the support sent by said angular position detection system. In such a manner during the rotation of the tyre, it is possible to correctly acquire a succession of images of linear portions, independent of the rotation speed of the tyre.

Further characteristics and advantages will be clearer from the detailed description of several non-exclusive exemplifying embodiments of a method and an apparatus for checking tyres in a tyre production line, in accordance with the present invention.

BRIEF DESCRIPTION OF THE DRAWINGS

Such description will be set forth hereinbelow with reference to the enclosed figures, provided as only as a non-limiting example, in which.

DETAILED DESCRIPTION

With reference to the figures, reference number 1 generally indicates an apparatus for checking tyres in a tyre production line according to the present invention. In general, the same reference number will be used for possible embodiment variants of similar elements.

The apparatus 1 comprises a support 102 adapted to support the tyre 200 on one sidewall and to rotate the same around its rotation axis 201, typically arranged according to the vertical. The support 102 is typically actuated by a movement member that is not further described and illustrated, since it can as an example be of known type. The support for the tyre may possibly be configured for blocking the same, for example the respective abutted bead.

The apparatus comprises a detection system 104 comprising a linear camera 105 having an objective line 106 lying on an optical plane 107 passing through the linear camera.

Figure 1:
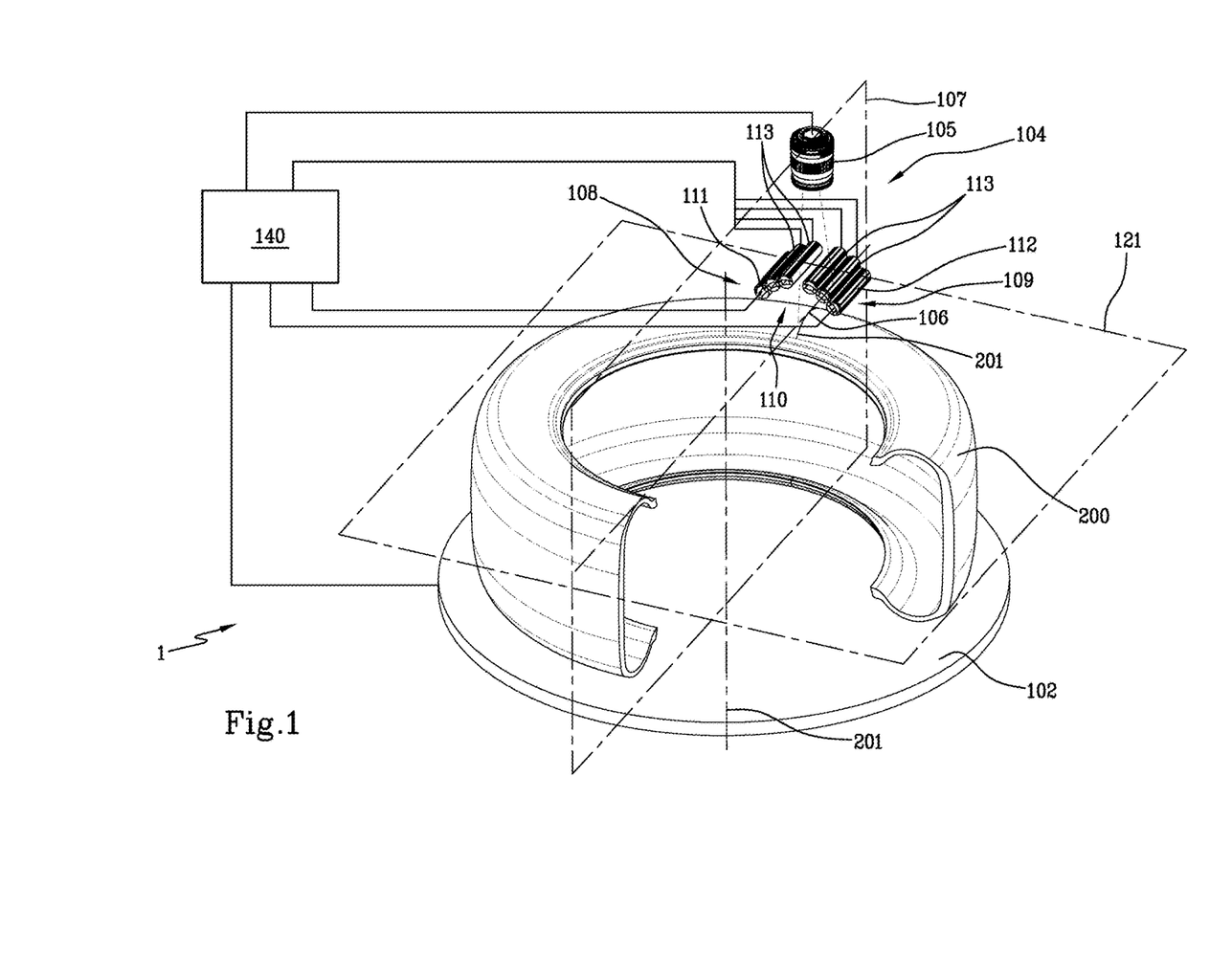
FIG. 1 shows a partial and schematic perspective view, partially in cross section and partially in terms of functional blocks, of an apparatus for checking tyres in accordance with a first embodiment of the present invention.
Figure 2:
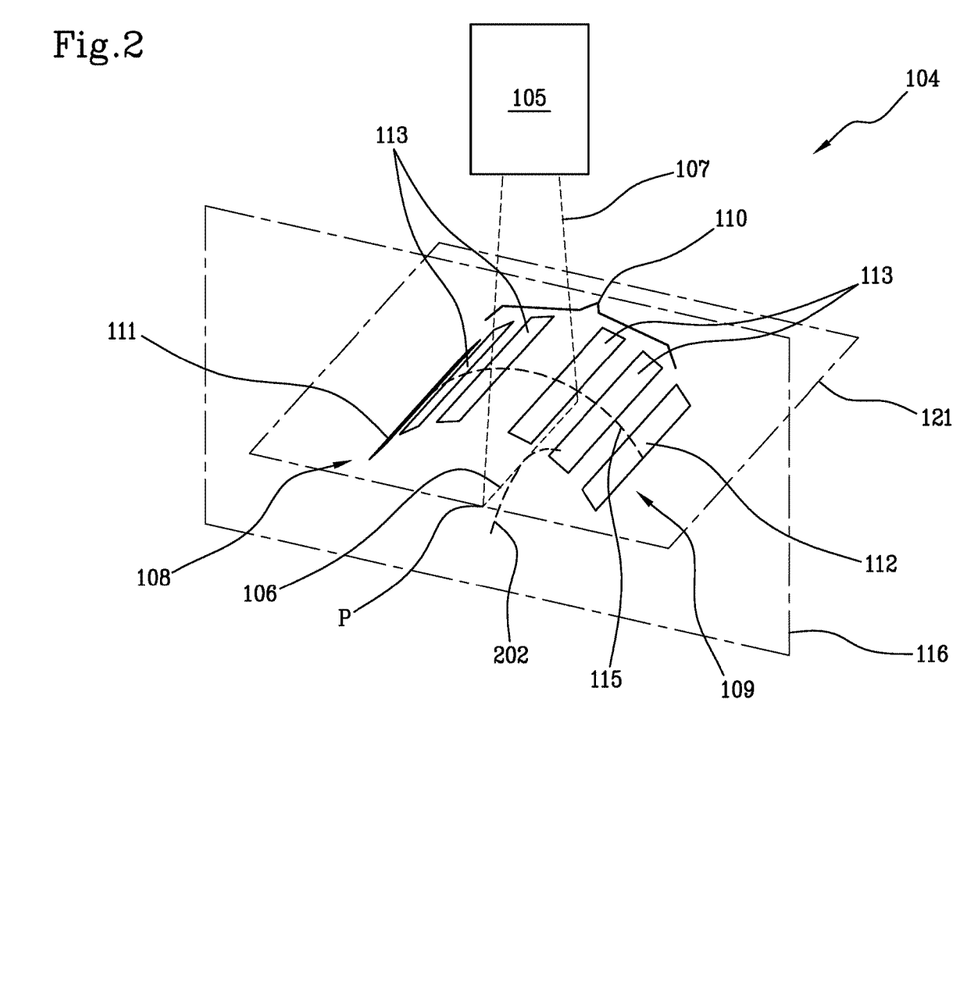
FIG. 2 shows a partial and schematic perspective view of a detail of FIG. 1.
Figure 2A:
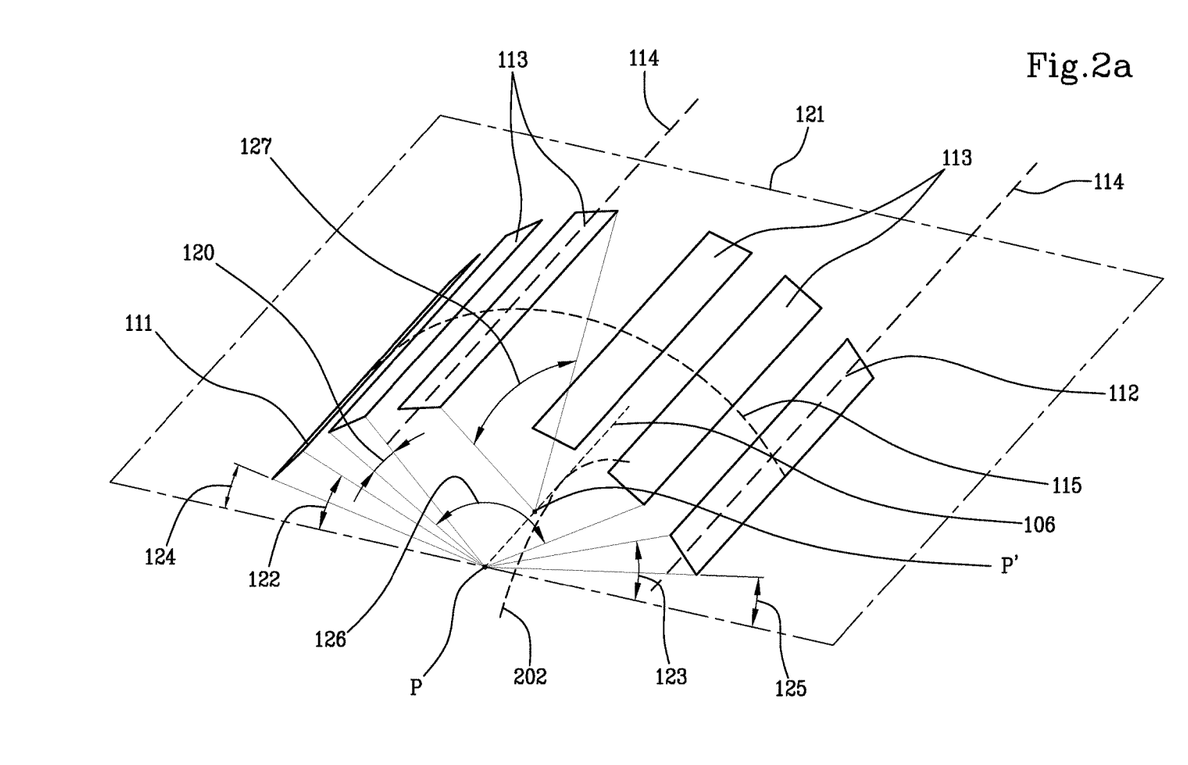
FIG. 2a shows an enlarged detail of FIG. 2.

The apparatus comprises a first light source 108, a second light source 109 and a third light source 110 adapted to respectively emit a first, a second and a third light radiation for illuminating a linear surface portion 202 of said tyre coinciding with the objective line (e.g. when the surface portion is planar) or in proximity to the objective line (due to the curvilinear progression of the surface of the tyre), as shown in FIGS. 1 and 2, 2a.

The detection system is adapted to acquire a respective two-dimensional digital image of the linear surface portion illuminated by at least one from among the first, second and third light radiation.

Typically the apparatus comprises a robotic arm (not shown) on which said first light source, second light source and third light source and the detection system are mounted.

Preferably the first light source 108 and the second light source 109 are each constituted by a single respective sub-source 111 and 112.

Preferably the third light source 110 is constituted by four respective sub-sources 113 distributed on both sides of the optical plane 107 and symmetrically with respect to such plane.

Each sub-source 111-113 has a respective main extension direction (indicated as an example with the dashed lines 114 in FIG. 2a) which is extended parallel to the optical plane 107 and hence to the objective line 106.

Each sub-source typically comprises a plurality of LED sources arranged aligned along the main extension direction.

In the enclosed figures, the sub-light sources are schematically shown with reference to their respective emitting surface (in the figures, as an example with rectangular shape), which for example can coincide with a transparent protection glass and/or diffuser.

Figure 3:
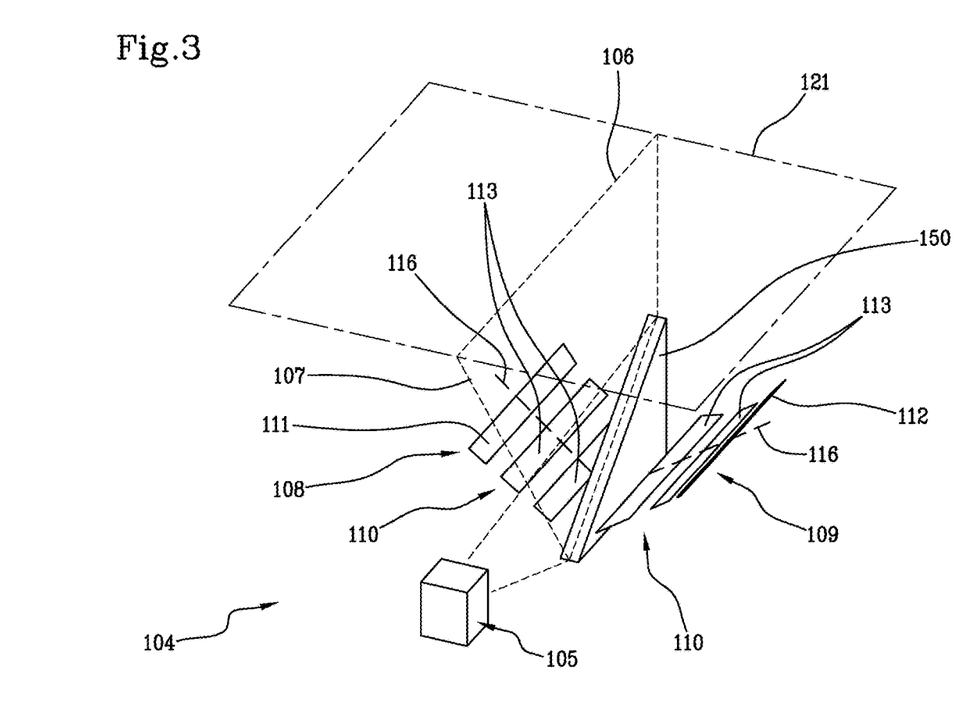
FIG. 3 shows a partial and schematic perspective view of an apparatus for checking tyres in accordance with a second embodiment of the present invention.

As an example, the sub-sources have a size along the main extension direction 114 equal to 10 cm for the embodiment shown in FIG. 2 and 6 cm for the embodiment shown in FIG. 3, and a size along the direction orthogonal to the main extension direction equal to about 1 cm.

Preferably the sub-sources 111 and 112 respectively lie on opposite sides with respect to the optical plane and are equidistant therefrom.

Preferably the distance of the sub-sources 113 of the third light source from the optical plane 107 is less than the distance between each sub-source of said first light source and second light source and the optical plane.

Preferably the sub-sources of the first light source, second light source and third light source are arranged in a manner such that for their entire extension they are superimposed in a view orthogonal to the objective line. As an example all the first and second ends, with respect to the main extension direction, lie on a respective plane orthogonal to the objective line.

In one embodiment, as shown as an example in FIGS. 1 and 2, 2a, the sub-sources of the first light source, second light source and third light source are arranged along a line (indicated with the number 115 in FIG. 2) on a reference plane 116 orthogonal to the objective line, line 115 being shaped as an arc of a circle with centre on the objective line (i.e. the sub-sources are equidistant from the objective line).

In an alternative embodiment, as shown in FIG. 3, the sub-sources are arranged along an angle line (indicated with the number 116 in FIG. 3) on the reference plane 116, with vertex on the optical plane 107.

As an example, for each point P (as an example indicated at one end in FIGS. 2 and 2a) of the objective line, a respective angle 120 (in FIG. 2a, shown with reference to a sub-source 113) having vertex at the point P and lying in a plane orthogonal to the objective line, and subtended by each of the sub-sources is equal to 6°.

As an example, with a focal plane 121 orthogonal to the optical plane and passing through the objective line 106, the respective maximum angle 122 and 123 among all the angles formed between the focal plane and the planes passing through the objective line and all the points respectively of the first light source 108 and the second light source 109 (respectively of the sub-sources 111 and 112) is equal to 48°.

As an example, the respective minimum angle 124 and 125 among all the angles formed between the focal plane and the planes passing through the objective line and all the points respectively of the first light source and the second light source is equal to 42°.

Preferably the third light source 110 is adapted for illuminating the objective line with diffuse light.

As an example, a respective angle 126 having vertex at each point P of the objective line and lying in a plane orthogonal to the objective line, and subtended by the third light source, is equal to about 80°. In such a manner, a wide solid angle of the diffuse light is obtained.

As an example, a respective angle having vertex at each point P of the objective line and lying in the aforesaid orthogonal plane, and subtended by the set of the first light source, the second light source and the third light source, is equal to 96°.

In one embodiment of the apparatus particularly suitable for inspecting the internal surface of the tyre, as an example shown in FIG. 3, the detection system comprises a mirror 150 (also typically mounted on the robotic arm) having flat reflective surface arranged at the third light source perpendicular to the optical plane and intersecting the latter (typically on the median line of the mirror) in a manner so as to reflect the objective line in the optical plane by an angle as an example equal to 90°.

Preferably a command and control unit 140 is comprised that is configured for:
selectively activating one or more of said first light source, second light source and third light source;
activating the linear camera in order to acquire a respective two-dimensional digital image (colour or monochromatic) of the linear surface portion synchronously with the activation of one or more of said first light source, second light source and third light source.

The command and control unit is typically configured for also driving the movement member of the support 102. In such a manner, there is the succession of linear surface portions at the objective line of the linear camera, which can remain fixed.

Preferably the apparatus comprises an encoder (not shown) for detecting the angular position of the support, the command and control unit being configured for activating said first light source, second light source, and preferably third light source and driving the detection system as a function of a signal of angular position of the support sent by the encoder.

Preferably the command and control unit 140 is configured for:
activating in alternated sequence said first light source, second light source and third light source;
driving the linear camera in order to acquire respectively a first, second and third image synchronously with the activation of the first light source, the second light source and the third light source, respectively. In such a manner it is possible to acquire both an image in diffuse light and two images in grazing light.

Preferably a processing unit (e.g. integrated in the command and control unit 140) is comprised, configured for the following functions:

receiving the acquired images from the linear camera;

processing the images in order to check the surface portion.

Preferably the processing unit is configured for calculating the difference between the first and second image in order to obtain information on an altimetric profile (e.g. possible presence or lack of reliefs and/or depressions) of the linear surface portion.

Preferably, calculating the difference between the first and second image comprises calculating a difference image in which each pixel is associated with a value representative of the difference between the values associated with the corresponding pixels in the first and second image. In such a manner, it is possible to use the image obtained from the difference between the first and second image in order to indicate the three-dimensional elements (such as the pitting in relief on the internal surface of the tyre or the writing in relief) and keep such information under consideration in processing the image in diffuse light in order to search for defects.

A method for checking the surface of tyres in a tyre production line, which uses the aforesaid apparatus, is described hereinbelow.

First of all, a tyre 200 to be checked, for example abutted against a sidewall above the support 102, is arranged.

The command and control unit 140 drives the robotic arm in order to move the light sources close to the (external or internal) surface of the tyre, in a manner such that a linear surface portion at least partially coincides with, or is in proximity to, the objective line.

Then, the command and control unit drives the movement member of the support 102 in order to rotate the tyre.

As a function of the signal of angular position received by the encoder, with the rotation of the tyre underway, the command and control unit cyclically activates, in rapid alternated sequence, said first light source, second light source and third light source and activates the linear camera in order to acquire a respective two-dimensional digital image (colour or monochromatic) of the respective linear surface portion synchronously with the activation of the first light source, the second light source and the third light source, respectively. As an example, each single digital image of a linear portion comprises 1×2048 pixels in case of monochromatic camera, or 2×2048 pixels in the case of bilinear or RGB colour camera.

As an example, the time lag between the acquisition of the first and second linear image, as well as between the second and third linear image and then cyclically between the first and third linear image, is less than 0.2 milliseconds.

After having executed the desired rotation of the tyre for sounding the desired surface portion, preferably at least one complete rotation in order to acquire the entire circular extension, a single digital image is obtained that is achieved with all the digital images of the sequence of linear portions, each illuminated with a respective light source. The processing unit receives such image from the detection system and separates the corresponding first, second and third image of the entire desired surface portion.

Such images are substantially superimposable pixel-by-pixel, even if the actual linear surface portion associated with a single linear image does not exactly coincide for the three images, due to the rotation of the tyre that in the meantime took place. Nevertheless, the selection of the acquisition frequency of the images and of the rotation speed is such that the three images are interlaced with each other and hence can be compared pixel-by-pixel. Advantageously, each pixel of the first (or second or third) image shows a micro-surface portion which is separated from the micro-surface portion shown by the pixel of the second (or respectively third or first) image corresponding to said each pixel, except for the linear surface size associated with a pixel, as an example the spatial gap being equal to about a third of a pixel. In such a manner, the three images are interlaced with each other and the acquisition of the three linear images occurs in a time interval during which the tyre has rotated a section equal to one pixel (as an example equal to 0.1 mm).

As an example, for each point of each linear surface portion, and hence for each point of the sounded surface portion, all the respective overall light power of the first and second light radiation incident at the point respectively comes from two half-spaces that are opposite with respect to the optical plane 107.

For each point of each linear surface portion, all the respective overall light power of the first and second light radiation incident on the point forms, with the plane tangent to the surface at the point (i.e. the focal plane 121), an incidence maximum angle 122 and 123 equal to about 48° (grazing light).

Preferably all the respective overall light power of the first, second and third light radiation incident on each point of the surface portion (or objective line) forms, with a reference plane 116 orthogonal to the optical plane and passing through the perpendicular to the surface at the point, an incidence angle smaller than or equal to 45°, in absolute value. For example, the angle 127 having vertex at any point (indicated as an example with P' in FIG. 2*a*) of the objective line, lying in any one plane passing through the objective line and through the first light source and the second light source or the third light source, and subtended by the first light source, by the second light source or by the third light source, respectively, is equal to 60°. In such a manner, advantageously, each sub-source emits a directional light radiation incident on the objective line.

Preferably the processing unit processes the first and second image, comparing them with each other in order to obtain information on an altimetric profile of the surface portion. Preferably the comparison between the first and second image comprises calculating a difference image in which each pixel is associated with a value representative of the difference between the values associated with the corresponding pixels in the first and second image.

Preferably, before comparing the first and second image with each other, provision is made for equalising the first and second image with respect to each other, for example by equalising the average brightness thereof overall or locally.

Preferably the processing unit processes the third image in diffuse light in order to detect the possible presence of defects on the surface portion, using the information obtained from the aforesaid comparison between the first and second image.

Figure 4A:
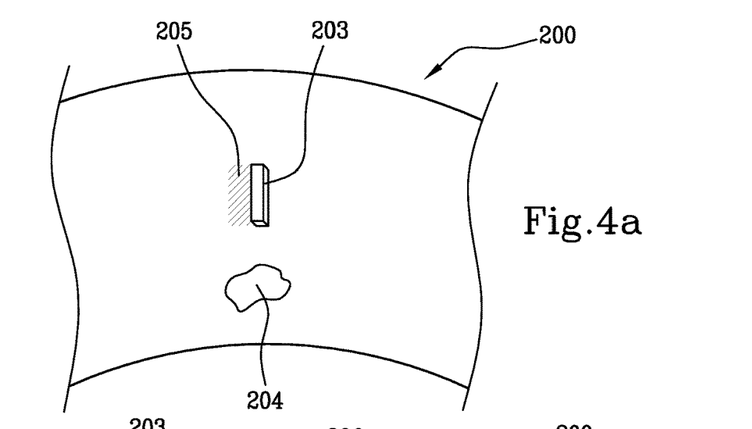
FIGS. 4a and 4b schematically show an image of a tyre surface portion illuminated respectively with right and left grazing light.
Figure 4B:
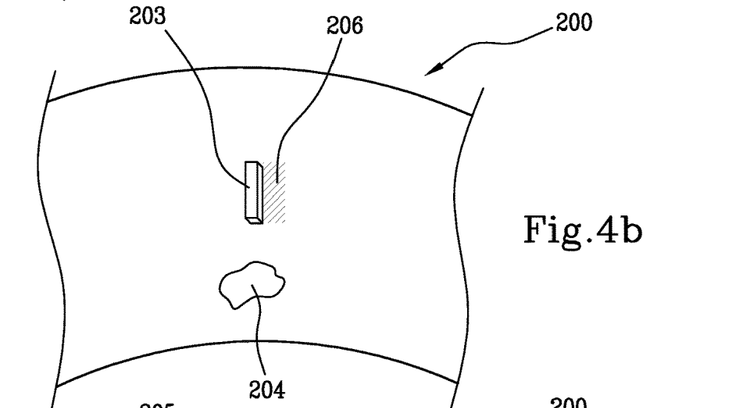

FIGS. 4*a* and 4*b* schematically show an embodiment respectively of a first and second image of a surface portion of tyre 200 comprising an element in relief 203 and an element without reliefs, or two-dimensional element, 204 (such as a release agent stain).

In FIG. 4*a*, where the image is obtained with grazing light from the right of the figure, the image comprises a shade zone 205 projected towards the left by the element 203; in FIG. 4*b*, where the image is obtained with grazing light from the left of the figure, the image comprises a shade zone 206 projected towards the right by the same element 203. It is observed that the element 204 is instead acquired substantially in an identical manner in the two images, since it equally meets the right and left grazing illuminations.

Figure 4C:
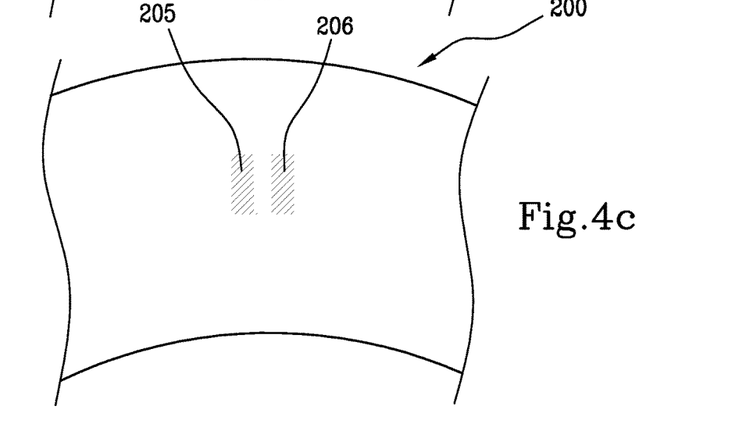
FIG. 4c schematically shows an image obtained via comparison of the images 4a and 4b.

FIG. 4c schematically shows a difference image obtained by associating each pixel with the difference, in absolute value, between the values of the two images of FIGS. 4a and 4b. As can be seen, at the two-dimensional stain 204, the difference image does not have any brightness variation, while at the element in relief 203 (marked with shading in FIG. 4c) there is a considerable brightness variation, marking the presence of the element itself 203.

The invention claimed is:

1. An apparatus for checking tyres in a tyre production line, the apparatus comprising:
   a support for a tyre;
   a detection system comprising a linear camera having an objective line lying on an optical plane passing through the linear camera;
   a first, a second, and a third light source, adapted to respectively emit a first, a second, and a third light radiation in order to illuminate a linear surface portion of said tyre coinciding with or in proximity to said objective line;
   a command and control unit configured to:
      selectively activate at least one from among said first light source, second light source and third light source, and
      activate said linear camera in order to acquire a respective two-dimensional image of said linear surface portion synchronously with the activation of said at least one from among said first, second and third light source,
   wherein:
      said first and second light source respectively lie on opposite sides with respect to said optical plane; and
      each of said first, second, and third light source comprises one or more respective light sub-sources, each having a respective main extension direction which forms, with said optical plane, an angle smaller than or equal to 45° and wherein a distance of said light sub-sources of the third light source from said optical plane is less than a distance between said first light source and second light source and said optical plane.

2. The apparatus according to claim 1, wherein, with a focal plane orthogonal to said optical plane and passing through the objective line, a respective angle formed between said focal plane and any one plane passing through said objective line and any one point respectively of said first light source and second light source is smaller than or equal to 60°.

3. The apparatus according to claim 2, wherein said respective angle is greater than or equal to 10°.

4. The apparatus according to claim 1, wherein said third light source is adapted to illuminate said objective line with diffuse light.

5. The apparatus according to claim 1, wherein for each point of the objective line, a respective angle having a vertex at the respective point and lying in a reference plane orthogonal to the objective line, and subtended by said third light source, is greater than or equal to 60°.

6. The apparatus according to claim 1, wherein a respective angle in a reference plane orthogonal to said objective line, having a vertex at each point of the objective line and subtended by a set of said first light source, second light source and third light source, is greater than or equal to 70°.

7. The apparatus according to claim 1, wherein said third light source comprises a plurality of respective light sub-sources distributed on both sides of said optical plane.

8. The apparatus according to claim 7, wherein said light sub-sources of said third light source are symmetrically distributed with respect to said optical plane.

9. The apparatus according to claim 1, wherein each of said first light source, second light source and third light source consists of said one or more respective light sub-sources.

10. The apparatus according to claim 1, wherein the first light source and the second light source each consist of only one light sub-source.

11. The apparatus according to claim 1, wherein said respective main extension direction of each of said one or more respective light sub-sources forms, with said optical plane, an angle smaller than or equal to 30°.

12. The apparatus according to claim 1, wherein said respective main extension direction of each of said one or more respective light sub-sources forms, with said optical plane, an angle smaller than or equal to 15°.

13. The apparatus according to claim 1, wherein said respective main extension direction of each of said one or more respective light sub-sources is parallel to said optical plane.

14. The apparatus according to claim 1, wherein said first light source and second light source lie equidistant from said optical plane.

15. The apparatus according to claim 1, wherein said respective light sub-sources have one dimension along the main extension direction that is at least double the dimension orthogonal to said main extension direction.

16. The apparatus according to claim 15, wherein each of said light sub-sources has the dimension along said main extension direction smaller than or equal to 20 cm.

17. The apparatus according to claim 15, wherein each of said light sub-sources has the dimension orthogonal to said main extension direction smaller than or equal to 3 cm.

18. The apparatus according to claim 1, wherein said respective light sub-sources are structurally and/or dimensionally equal to each other.

19. The apparatus according to claim 1, wherein said respective light sub-sources have a rectilinear extension along the main extension direction.

20. The apparatus according to claim 1, wherein the light sub-sources of the first light source, second light source and third light source are arranged in a manner such that, for at least half of their extension, they are superimposed in a view orthogonal to the objective line.

21. The apparatus according to claim 1, wherein the light sub-sources of the first light source, second light source and third light source are arranged along a line on a reference plane orthogonal to the objective line having a concavity directed towards the objective line.

22. The apparatus according to claim 1, wherein said light sub-sources are equidistant from said objective line.

23. The apparatus according to claim 1, wherein said light sub-sources are arranged as a triangle.

24. The apparatus according to claim 1, wherein, for each point of the objective line, a respective angle, having vertex at said each point and lying in a reference plane orthogonal to the objective line and subtended by each of said light sub-sources, is smaller than or equal to 10°.

25. The apparatus according to claim 1, wherein the detection system comprises a mirror having a reflective surface arranged at the third light source perpendicular to the optical plane and intersecting the latter in a manner so as to reflect said objective line in the optical plane by an angle greater than or equal to 30° and smaller than or equal to 135°.

26. The apparatus according to claim 1, wherein the command and control unit is configured to:
   activate, in an alternated sequence, said first light source, second light source and third light source; and
   drive said linear camera to respectively acquire a first, second and third image synchronously with the activation of said first light source, second light source and third light source, respectively.

27. The apparatus according to claim 1, wherein a processing unit is configured to:
   receive, from the linear camera, said respective image or said first, second and third image; and
   process said respective image or said first, second and third image in order to check said surface portion.

28. The apparatus according to claim 1, further comprising a robotic arm on which said first light source, second light source and third light source and said detection system are mounted.

29. The apparatus according to claim 1, further comprising a movement member configured to rotate said support, and hence the tyre, around a rotation axis thereof, the command and control unit being configured for driving said movement member.

30. The apparatus according to claim 1, further comprising a system for detecting the angular position of said support, the command and control unit being configured for selectively activating said first light source, second light source and third light source and driving said detection system as a function of a signal of angular position of the support sent by said angular position detection system.

* * * * *